US011080598B2

(12) United States Patent
Kotri et al.

(10) Patent No.: US 11,080,598 B2
(45) Date of Patent: Aug. 3, 2021

(54) AUTOMATED QUESTION GENERATION USING SEMANTICS AND DEEP LEARNING

(71) Applicant: SAP SE, Walldorf (DE)

(72) Inventors: Jayananda Appanna Kotri, Bangalore (IN); Abinaya S, Tirupur (IN); Yashwanth Dasari, Vijayawada (IN); Sharad Kejriwal, Bhagalpur (IN); Tarun Sharma, Bangalore (IN)

(73) Assignee: SAP SE, Walldorf (DE)

( * ) Notice: Subject to any disclaimer, the term of this patent is extended or adjusted under 35 U.S.C. 154(b) by 719 days.

(21) Appl. No.: 15/979,855

(22) Filed: May 15, 2018

(65) Prior Publication Data
US 2019/0354848 A1 Nov. 21, 2019

(51) Int. Cl.
| | |
|---|---|
| *G06N 3/08* | (2006.01) |
| *G06F 9/451* | (2018.01) |
| *G06F 40/30* | (2020.01) |
| *G06F 40/205* | (2020.01) |
| *G06F 40/253* | (2020.01) |
| *G06F 40/284* | (2020.01) |

(52) U.S. Cl.
CPC .............. *G06N 3/08* (2013.01); *G06F 9/451* (2018.02); *G06F 40/205* (2020.01); *G06F 40/253* (2020.01); *G06F 40/284* (2020.01); *G06F 40/30* (2020.01)

(58) Field of Classification Search
CPC ...... G06N 3/08; G06N 3/0427; G06N 3/0445; G06F 40/30; G06F 40/205; G06F 40/253; G06F 40/28; G06F 9/451
See application file for complete search history.

(56) References Cited

U.S. PATENT DOCUMENTS

| | | | | |
|---|---|---|---|---|
| 5,907,836 | A * | 5/1999 | Sumita | G06F 16/30 707/754 |
| 7,376,634 | B2 * | 5/2008 | Liu | G09B 7/00 706/61 |
| 9,213,771 | B2 * | 12/2015 | Chen | G06F 16/3329 |
| 9,330,084 | B1 * | 5/2016 | Kadambi | G06F 40/56 |
| 2004/0113953 | A1 * | 6/2004 | Newman | G06F 40/137 715/853 |
| 2011/0125734 | A1 * | 5/2011 | Duboue | G09B 7/00 707/723 |
| 2013/0196305 | A1 * | 8/2013 | Adir | G09B 29/00 434/322 |
| 2014/0156260 | A1 * | 6/2014 | Zweig | G06F 40/237 704/9 |

(Continued)

OTHER PUBLICATIONS

Das et al. Automatic question generation and answer assessment: a survey. Research and Practice in Technology Enhanced Learning (2021) 16:5 https://doi.org/10.1186/s41039-021-00151-1. 15 pages. (Year: 2021).*

Zhou et al. Neural question generation from text: a preliminary study. arXiv:1704.01792v3 [cs.CL] Apr. 18, 2017. 6 pages. (Year: 2017).*

(Continued)

*Primary Examiner* — Amy M Levy

(74) *Attorney, Agent, or Firm* — Schwegman Lundberg & Woessner, P.A.

(57) ABSTRACT

In an example embodiment, factual question generation from freeform content is achieved through semantic role labeling and recurrent neural networks (RNNs). Specifically, semantic role labeling is used to identify an answer phrase so that it can be replaced with an appropriate question word. RNNs are then used to extract triples (Subject-Object-Predicate) from the sentence, and each of these triples can be used as an answer phrase/word. An RNN is then fed with training data to generate the questions more efficiently.

20 Claims, 6 Drawing Sheets

(56) References Cited

U.S. PATENT DOCUMENTS

| | | | |
|---|---|---|---|
| 2016/0180242 A1* | 6/2016 | Byron | G06N 5/041 706/11 |
| 2017/0109355 A1* | 4/2017 | Li | G06N 3/0445 |
| 2017/0213469 A1* | 7/2017 | Elchik | G06F 40/186 |
| 2018/0260472 A1* | 9/2018 | Kelsey | G06F 40/30 |
| 2019/0043379 A1* | 2/2019 | Yuan | G06N 3/0454 |
| 2019/0228099 A1* | 7/2019 | Bajaj | G06N 3/08 |

OTHER PUBLICATIONS

Du et al. Learning to ask: Neural natural question generation for reading comprehension. acarXiv: 1705.00106v1 [cs.CL] Apr. 29, 2017. 11 pages. (Year: 2017).*

Kumar et al. RevUP: Automatic gap-fill question generation from educational texts. Proceedings of the Tenth Workshop on Innovative Use of NLP for Building Educational Applications, 2015, pp. 154-161, Denver, Colorado, Jun. 4, 2015. © 2015 Association for Computational Linguistics. (Year: 2015).*

Du et al. Harvesting paragraph-level question-answer pairs from Wikipedia, arXiv:1805.05942v1 [cs.CL] May 15, 2018. 14 pages (Year: 2018).*

Singh et al. Encoder-Decoder Architectures for Generating Questions. International Conference on Computational Intelligence and Data Science (ICCIDS 2018). Published by Elsevier Ltd. Retrieved from ScienceDirect. 10.1016/j.procs.2018.05.019. 8 pages. (Year: 2018).*

Sabramanian et al. Neural models for key phrase extraction and question generation. arXiv:1706.04560v3 [cs.CL] May 30, 2018. 11 pages. (Year: 2018).*

Rakangor et al. Literature Review of Automatic Question Generation Systems. International Journal of Scientific and Research Publications, vol. 5, Issue 1, Jan. 2015, ISSN 2250-3153. 5 pages. (Year: 2015).*

Becker et al. Mind the gap: learning to choose gaps for question generation. 2012 Conference of the North American Chapter of the Association for Computational Linguistics: Human Language Technologies, pp. 742-751, Montreal, Canada, Jun. 3-8, 2012. © 2012 Association for Computational Linguistics. (Year: 2012).*

Baghee. Automatic neural question generation using community-based question answering systems (thesis). Department of Mathematics and Computer Science, University of Lethbridge. © 2017. 84 pages. (Year: 2017).*

* cited by examiner

AUTOMATED QUESTION GENERATION USING SEMANTICS AND DEEP LEARNING

TECHNICAL FIELD

This document generally relates to systems and methods for question generation from electronic written content. More specifically, this document relates to the automated generation of questions using semantics and deep learning.

BACKGROUND

As online or other electronic content has become the prevalent source of written content, the challenges in generating questions from the content has grown significantly due to the scale of such endeavors. For example, it is common for providers of certain types of electronic written content to encourage engagement by viewers of the electronic written content by providing questions about the content to the viewers. A common example would be online learning providers, which may provide online courses or other content and then provide questions about the content to the viewer in the form of a test. In some instances, these questions may additionally be used to ensure that the viewer has actually read the content and not, for example, merely allowed the content to appear on his or her display for a period of time without actually reading it.

While traditionally such questions have been generated by human experts who review the content and create the questions, this is not feasible on a large scale. Thus, it would be beneficial to automate this question creation so that a computer could create the questions. There are, however, technical challenges involved in doing so, as human actions taken to create questions do not translate well into computer instructions. Simple machine learning algorithms, furthermore, are not accurate enough to create understandable and relevant questions from written content, given the complexities of languages.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, factual question generation from freeform content is achieved through semantic role labeling and recurrent neural networks (RNNs). Specifically, semantic role labeling is used to identify an answer phrase so that it can be replaced with an appropriate question word. RNNs are then used to extract triples (Subject-Object-Predicate) from the sentence, and each of these triples can be used as an answer phrase/word. An RNN is then fed with training data to generate the questions more efficiently. Furthermore, in some example embodiments, user feedback data is used to improve the quality of the questions by updating parameters and/or weights in the RNN.

In one specific example embodiment, a system employing the techniques described above can generate a Frequently Asked Questions document about the content. The questions generated can be modified based on prior evaluations to generate a complete and exhaustive set.

Figure 1:
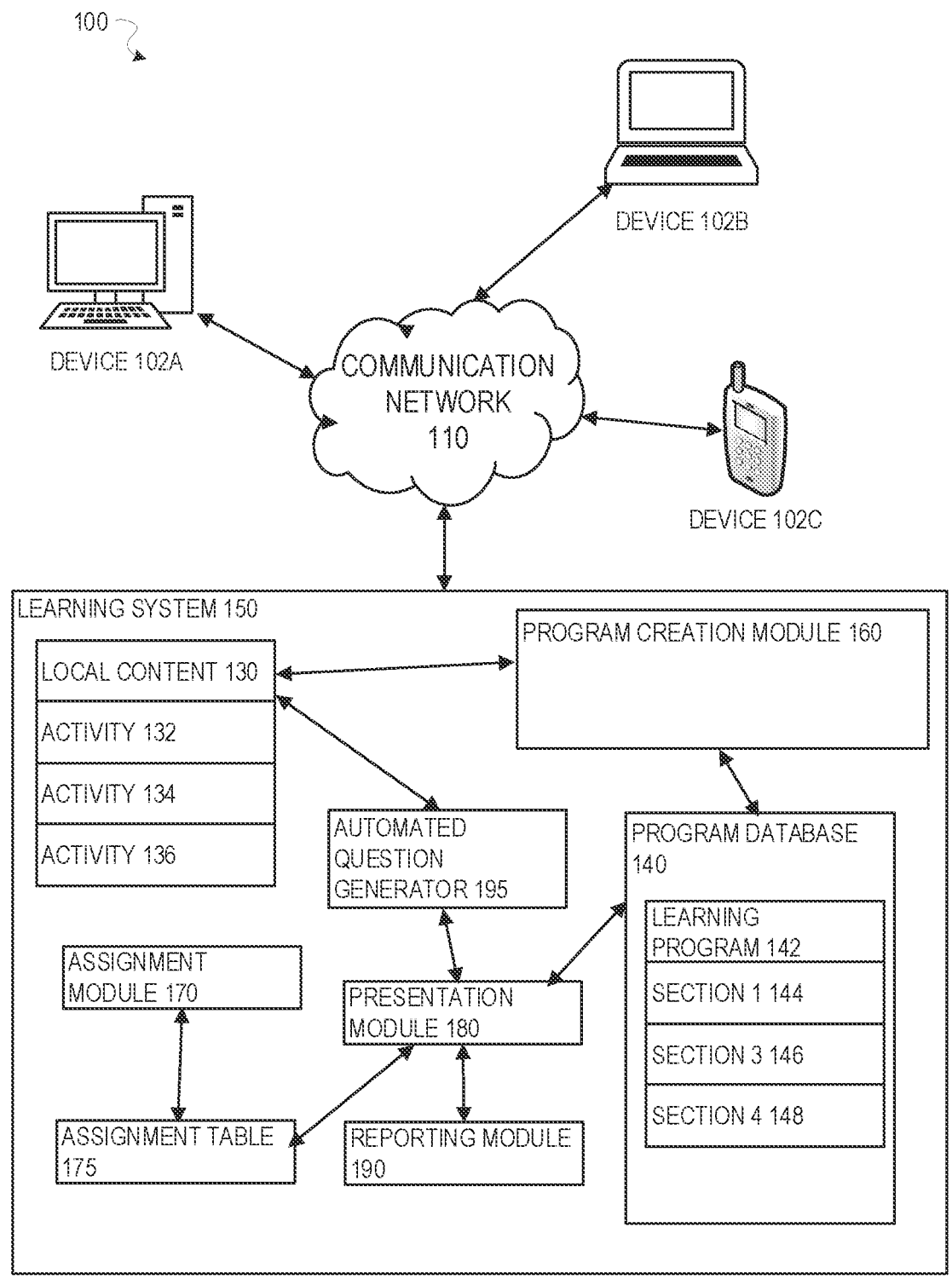
FIG. 1 illustrates a system for generating and providing learning programs to users in accordance with an example embodiment.

FIG. 1 illustrates a system 100 for generating and providing learning programs to users in accordance with an example embodiment. The system 100 includes a learning system 150, a device 102A, a device 102B, and a device 102C. The device 102A can be operated by an administrator, who is a person within an organization that is responsible for generating a learning program, while the device 102B and the device 102C can be operated by a user The device 102A can communicate with the learning system 150 via a communication network 110 to provide instructions for generating a learning program. The device 102A can also communicate with the learning system 150 via the communication network 110 to provide instructions for assigning learning programs to one or more users within the organization. For example, the learning system 150 can present a learning program to the user. Depending on whether the user is logged into the device 102B or the device 102C, the learning system 150 can present the learning program on one of these two devices.

The learning system 150 includes a program creation module 160, an assignment module 170, and a presentation module 180. The program creation module 160 may be configured to generate learning programs from available content. The available content includes local content 130, which includes learning activities 132, 134, and 136. The program creation module 160 can also communicate with remote content via the communication network 110 to retrieve additional content that is available. The program creation module 160 can retrieve learning activities from the local content 130 and the remote content to generate a learning program.

During execution of the learning program, the presentation module 180 can retrieve the learning program and present the contents stored within the learning program to a user who is assigned to the learning program. Here, the program creation module 160 can create a learning program 142 which contains a learning section 144, a learning section 146, and a learning section 148. Each learning section can include one or more learning activities from the local content 130 or the remote content. In some embodiments, the learning sections can group learning activities in a chronological or thematic fashion. The program creation module 160 can store the learning program 142 within a program database 140.

The assignment module 170 is configured to assign learning activities and learning programs to a particular user. Learning activities and learning programs which are assigned to a user are entered into an assignment table that corresponds to the user. Here, an assignment table 175 corresponds to the user. The administrator can transmit an instruction to the learning system 150 to assign the learning activity 134, the learning program 142, and the learning activity 132 to the user. In response to the instruction, the assignment module 170 can populate the assignment table 175 (which corresponds to the user) with the learning activity 134, the learning program 142, and the learning activity 132. In some embodiments, each entry in the assignment table 175 can include metadata to monitor the completion status of each item within the assignment table 175. For example, the metadata can monitor whether the learning activity 134 has been completed, or alternatively how much of the learning activity 134 has been completed. Similarly, the metadata can monitor whether the learning program 142 has been completed, or which learning sections (or learning activities) of the learning program 142 have been completed. Advantages of storing the completion status of each item assigned to a user include the ability to monitor which users have consumed what learning material and the ability to generate report/completion certificates for a given user. In some embodiments, restriction rules can be applied to each learning program stored in the program database 140.

The presentation module 180 is configured to present the learning material to a user. When the learning system 150 detects that the user has logged into the device 102B (or alternatively the device 102C), the presentation module 180 can transmit learning materials to the logged-in device for the user to consume. In one embodiment, the presentation module 180 can query the assignment table 175 for items which have been assigned to the user and present a list of learning materials which the user may consume to the logged-in device.

A reporting module 190 is configured to generate reports or certificates of completion for learning programs. In one embodiment, the reporting module 50 can generate a report for a manager to check on the completion status of learning programs which have been assigned to the direct reports of the manager. The report can include links which allow the manager to contact a direct report to discuss a learning program. In another embodiment, the reporting module 50 can generate a certificate of completion for a learning program. The certificate of completion can be generated and transmitted to a user when a user completes a learning program.

In an example embodiment, an automated question generator 195 can generate questions from content, such as the local content 130, automatically. These questions may then be used by the program creation module 160 to create a learning program 142 that includes one or more of the generated questions.

Figure 2:
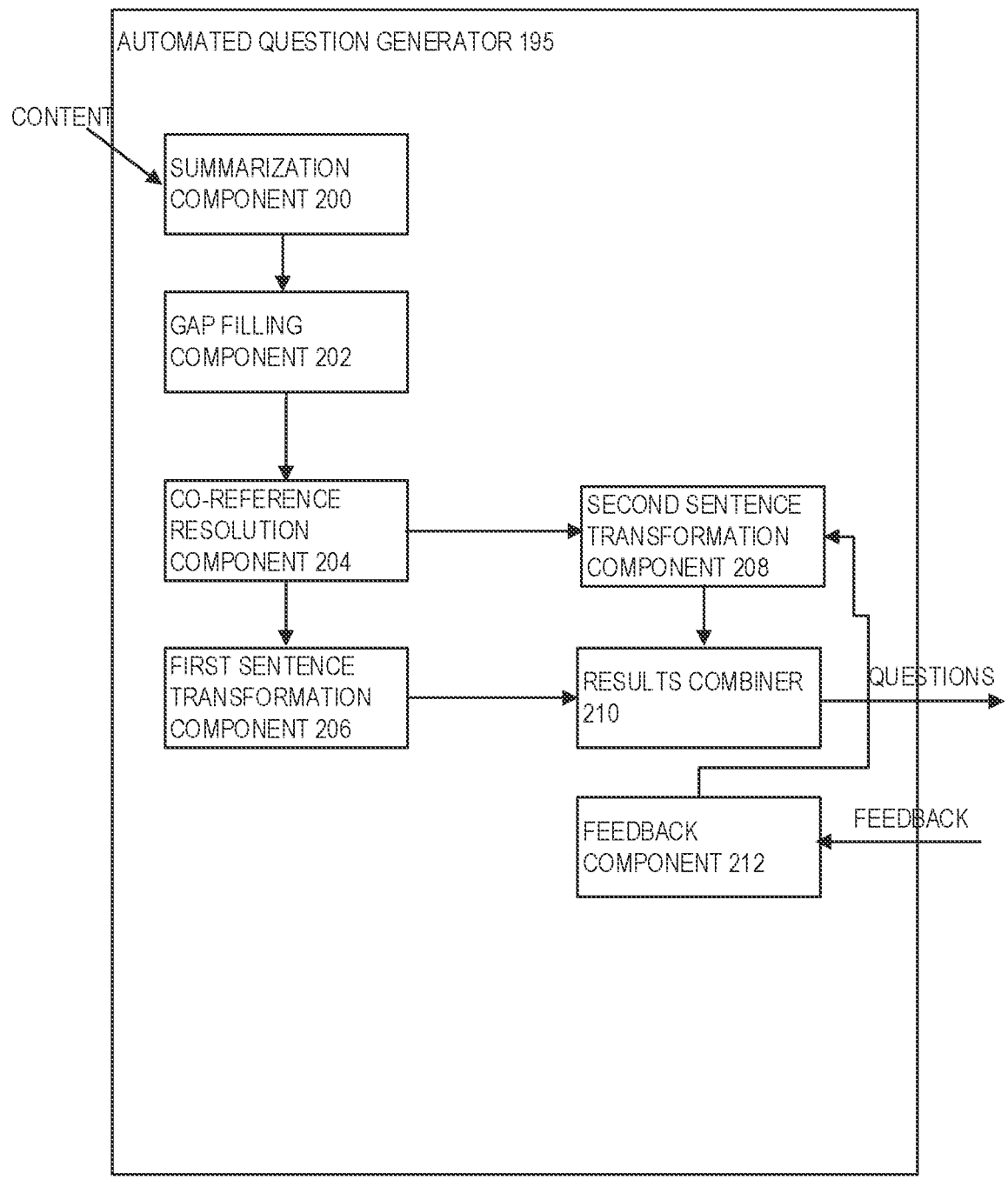
FIG. 2 is a block diagram illustrating an automated question generator in accordance with an example embodiment.

FIG. 2 is a block diagram illustrating an automated question generator 195 in accordance with an example embodiment. A summarization component 200 automatically creates a summary from input content. This summary is a condensed version of the input content. A gap filling component 202 then identifies keywords in the summary and creates gap-filling versions of the sentences using the keywords. A gap-filling version is a modified version of a sentence in the summary that contains missing keywords replaced with blanks or "gaps."

A co-reference resolution component 204 finds all expressions that refer to the same entity in a piece of content. Common expressions that refer to other entities in the same sentence are pronouns (e.g., "he" or "she"). The co-reference resolution component 214 is designed to identify pronouns in the input sentences and, for each identified pronoun, handle three primary situations. In the first, the pronoun has a referent (the noun to which the pronoun is referring to) and it is in the input sentence. In the second, the pronoun has a referent, but it is not in the input sentence (it may be, for example, in one of the preceding sentences). In the third, the pronoun simply has no referent (such pronouns are known as expletive pronouns, an example being "It" in the sentence "It is known that people like pie").

Statistically speaking, there is an almost 95% chance that the pronoun will be in one of the first two situations, and in the second situation, that the referent will be within the previous two sentences in the text.

Thus, first the given sentence is parsed using a natural language processing (NLP) parser tool, and pronouns and noun phrases are identified. Each pronoun and noun phrase is assigned attributes based on singularity (e.g., singular vs. plural), living/non-living status, and gender. Each pronoun is then assigned to the nearest noun phrase that shares the same attributes. Some attributes may be flexible. For example, "dog" is clearly singular and living, but it is unclear whether it is a male or female. In such cases, a flexible attribute is treated as a wild card and can be considered a match, but less of a match than an attribute that clearly matches.

Thus for example, in the sentences "The dog harked at Rebecca. So she ran into the house," there is only one pronoun ("she") and three nouns ("dog," "Rebecca," and "house"). The pronoun "she" has the attributes singular, living, and female. "Dog" has the attributes singular, living, and unknown gender. "Rebecca" has the attributes singular, living, and female. "House" has the attributes singular, non-living, and no gender. Thus, "house" is definitely not a match for "she." Using the described process. "Rebecca" is identified as the referent for "she" because "Rebecca" shares all the same attributes exactly. "Dog" is a possible referent for "she." but the above process selects "Rebecca" because "dog" only matches because a wild card is used, while "Rebecca" matches exactly. If instead the sentences read "The dog barked at Jim. So she ran into the house," then "dog" would be identified as the referent for "she" even though the dog's gender is unknown, because none of the other nouns match attributes, even using a wild card.

It should be noted that when it comes to wild card matching, an ordering can be ascribed to the attributes in the order of singularity, living/non-living status, and then gender. Thus, in cases where one matching noun has a wild card for singularity whereas another matching noun has a wild card for gender, the matching noun having the wild card for gender will be selected as the referent because the higher-order attributes are exact matches.

At this point, the sentences may be transformed into questions. In an example embodiment, two different approaches are taken for this transformation, and the results of these two different approaches are combined to produce an output. As such, there are two sentence transformation components. A first sentence transformation component 206 uses a semantic-based approach. A second sentence transformation component 208 uses a recurrent neural network-based approach. A results combiner 210 then identifies the intersection of the generated questions from the first sentence transformation component 206 and the second sentence transformation component 208. The questions may then be presented to a user. In some example embodiments, a user feedback component 212 may receive user feedback about the questions and present this feedback to the second sentence transformation component 208 to update the recurrent neural network. This feedback may take many forms. In some example embodiments, the feedback may be passive, in that the user feedback component 212 identifies viewers who it believes are likely to have read the content and understand it well (based on, for example, their professions or past usage history) and then determines if the viewers answered the questions correctly. If a viewer in whom the user feedback component 212 has high confidence answers questions incorrectly, it may be assumed that the question formation was faulty, and this feedback may be used by the second sentence transformation component 208 to re-learn portions of the recurrent neural network. In other example embodiments, this feedback may be more direct, in that a viewer may be presented with a questionnaire where he or she can review the questions and let the user feedback component 212 know explicitly which questions were faulty.

In some example embodiments, the user is given an option of selecting the questions based on various factors, such as relevance, grammatical accuracy, and semantic meaning. This data is recorded and stored, and helps to fine tune the system over a period of time. This data is helpful to find useful patterns in the way the user chooses which type of questions are grammatically consistent, etc. This data can also be used to generate a complete and exhaustive set of questions with higher accuracy over a period of time.

Referring to the summarization component 200, this component tokenizes the input content into sentences and then computes a frequency map of words in the sentences. The frequency map is filtered to ignore very low- and very high-frequency words. This way the summarization component 200 can discard noisy words such as determiners, that are frequent and don't contain much information, or words that only occur a few times in the content. The sentences can then be ranked based on the frequency of the words they contain. Sentences containing top-frequency (non-filtered) words are selected to be included in the summary. The ratio of summary sentences to original content may be predetermined. For example, it may be determined that a summary should contain 5% of the number of sentences of the original content.

Referring to the gap filling component 202, this component uses the frequency map generated by the summarization component 200 to also identify keywords. A predetermined ratio of keywords to original words may be used. For example, the predetermined ratio may be set to 0.2, in which case the top 20% of the non-filtered words in the frequency map (as ranked by frequency) are identified as keywords.

The gap filling component 202 then takes each sentence in the summary and replaces at most two keywords in each sentence with gaps (blanks).

Figure 3:
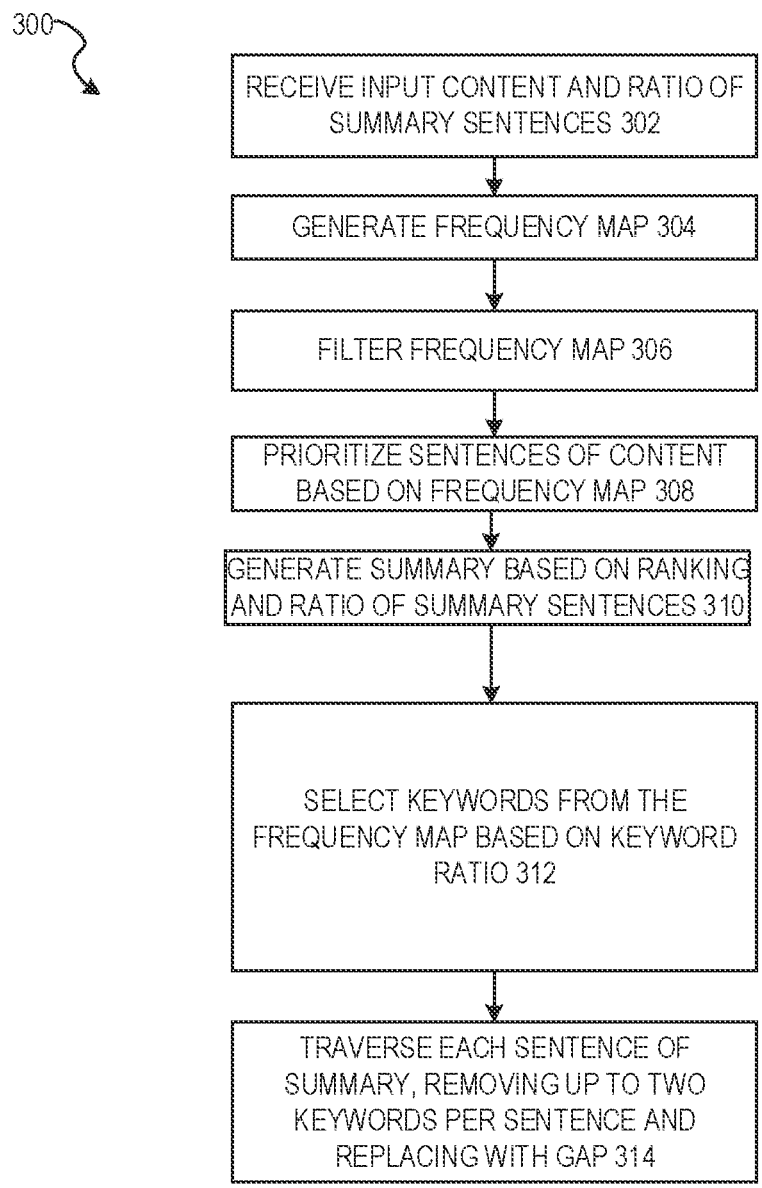
FIG. 3 is a flow diagram illustrating a method for summary and gap-filling sentence generation in accordance with an example embodiment.

FIG. 3 is a flow diagram illustrating a method 300 for summary and gap-filling sentence generation in accordance with an example embodiment. This method 300 may be performed by the summarization component 200 and gap filling component 202 of FIG. 2.

At operation 302, input content and a ratio of summary sentences are received. This ratio is, as described earlier, a ratio of the number of sentences that will be included in the summary to the number of overall sentences in the input content. At operation 304, a frequency map is generated, indicating the frequencies of occurrence of terms in the input content. In an example embodiment, this frequency map is ordered based on the frequency of occurrence, such that terms appearing more often in the content appear at the top of the map while terms appearing less often appear at the bottom. At operation 306, the terms in the frequency map are filtered to remove high- and low-frequency terms. In an example embodiment, definitions for what constitutes a high- or low-frequency term may be predetermined (e.g., terms appearing in more than half of all sentences in the content and terms appearing only three or fewer times in the content, respectively) and those terms removed from the frequency map.

At operation 308, sentences in the content are prioritized based on the frequency map. This may include ranking a sentence higher if it contains one or more non-filtered-out high frequency terms. The result of operation 308 is a ranking of all sentences in the content based on the frequency map. At operation 310 a summary is generated based on the ranking and based on the ratio of summary sentences. Thus, for example, if the ratio is 5%, then the top 5% of ranked sentences are selected for the summary.

At operation 312, keywords are selected from the frequency map based on a keyword ratio. Thus if, for example, the keyword ratio is 0.2, then the top 20% of the terms in the frequency map (that haven't been filtered out), as ranked by frequency, are selected as keywords.

At operation 314, each sentence of the summary is traversed, removing up to two keywords per sentence and replacing them with a gap. The result is a set of gap-filled sentences from the summary.

Figure 4:
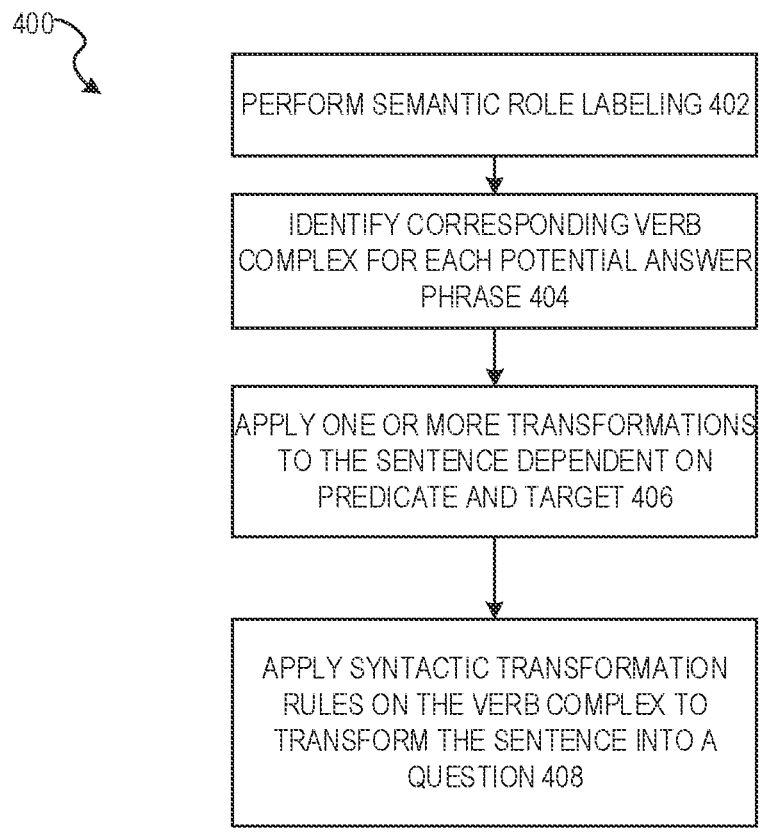
FIG. 4 is a flow diagram illustrating a method for semantic-based sentence transformation in accordance with an example embodiment.

Referring to the first sentence transformation component 206, as described earlier, this component uses a semantic-based approach to generate a question from input sentences. Here the input sentences may be the gap-filled sentences on which co-reference resolution has been performed. FIG. 4 is a flow diagram illustrating a method 400 for semantic-based sentence transformation in accordance with an example embodiment. At operation 402, semantic role labeling is performed. Semantic role labeling is the process of splitting the given sentence into various phrases/clauses based on the roles they perform. Parts of Speech (POS) tagging is then performed to identify the role of each word in the particular phrase/clause. This helps identify the potential answer phrases and map them with corresponding arguments. In one example embodiment, the role labels are ARGM-MNR, ARGM-PNC, ARGM-CAU, ARGM-TMP, ARGM-LOC, ARGM-DIS, ARGM-PERSON, and ARGM-THING, as described in Table 1 below:

TABLE 1

| QUESTION TYPE | ROLE DESCRIPTION | SEMANTIC ROLE |
|---|---|---|
| HOW | MANNER MARKER | ARGM-MNR |
| WHY | CAUSE CLAUSE | ARGM-CAU |
| WHY | PURPOSE CLAUSE | ARGM-PNC |
| WHEN | TEMPORAL MARKER | ARGM-TMP |
| WHO | SUBJECT/OBJECT | ARGM- PERSON (living object) |
| WHAT, WHICH (Based on the context) | SUBJECT/OBJECT | ARGM -THING (non-living object) |
| WHERE | LOCATIVE | ARGM-LOC |
| HOW | DISCOURSE MARKER | ARGM-DIS |

Semantic role labeling includes parsing, predicate (action/verb) identification and classification, argument identification, and argument classification. In the parsing step, words are classified by parts of speech, and a parse tree is created with the corresponding tag at the leaf node. Predicate identification and classification identifies the verb that specifies the action part. Argument identification identifies, for each predicate, arguments using a machine learned model. Arguments are words that the verb acts from or upon, or otherwise involves. In the sentence "Carl fancied Theresa from the first day they met," "Carl" and "Theresa" are the arguments for the verb "fancied."

The same machine learned model can then classify each argument. For example, "Carl" is the performer of the verb and "Theresa" is the object of the verb.

The semantic role labeler also then labels phrases, based on the underlying labels of their constituent words as identified in the leaf nodes. These phrase labels can then be compared with the answer phrases identified in Table 1 above to identify potential answer phrases and their corresponding question types.

At operation 404, for each potential answer phrase, a corresponding verb complex is identified. Specifically, for each potential answer phrase, the sentence is searched for any modal or auxiliary. If a modal or auxiliary is present, then it is retrieved and stored. If not, the modal/auxiliary can be generated based on the tense of the corresponding verb, using table 2 as follows:

TABLE 2

| AUXILIARY | PARTS OF SPEECH |
|---|---|
| Did | Verb, past tense |
| Do | Verb, non-$3^{rd}$ person singular present |
| Does | Verb, $3^{rd}$ person singular present |

At operation 406, one or more transformations are applied to the sentence depending on the predicate and the target. "Target" refers to the potential answer phrase, while "predicate" is the action part of the sentence. Transformations are performed in three steps. In the first, the target is deleted and replaced with the first proposition (if any). In the second, the question word identified in table 1 as corresponding to the target is added at the beginning of the sentence. In the third, all optional arguments to the left of the predicate are moved to the end of the sentence. This is because questions are well-formed when additional information is at the end rather than the beginning of the sentence.

At operation 408, syntactic transformation rules are applied to the verb complex of the sentence to transform the declarative sentence into a question. This is known as "subject-auxiliary inversion." If the verb complex includes an auxiliary, it is moved to immediately after the question word. If not, then an auxiliary identified in operation 404 is introduced into the sentence. Thus, "John has eaten all the heirloom tomatoes" is transformed into "Has John eaten all the heirloom tomatoes?"

This completes the first transformation.

Referring now to the second sentence transformation component 208, this component uses an RNN-based approach.

An RNN is a class of neural networks where connections between units form a directed cycle. This allows it to exhibit dynamic temporal behavior and process arbitrary sequences of inputs. Examples of RNNs include fully recurrent networks, recursive networks, Hopfield networks, bidirectional associative memory, Elman networks, Jordan networks, echo state networks, neural history compressors, long short-term memory, gated recurrent units, bi-directional networks, continuous-time networks, hierarchical networks, recurrent multilayer perceptrons, multiple timescales models, neural Turing machines, differentiable neural computers, and neural network pushdown automata. Training of neural networks may be performed via, for example, gradient descent or genetic algorithms.

Gradient descent is a first-order iterative optimization algorithm for finding the minimum of a function. In neural networks, it can be used to minimize the error term by changing each weight in proportion to the derivative of the error with respect to that weight, provided the non-linear activation functions are differentiable.

One possibility is called "backpropagation through time." or BPTT, and is a generalization of backpropagation for feed-forward networks. Like that method, it is an instance of automatic differentiation in the reverse accumulation mode of Pontryagin's minimum principle. A more computationally expensive online variant is called "Real-Time Recurrent Learning." which is an instance of automatic differentiation in the forward accumulation mode with stacked tangent vectors. Unlike BPTT, this algorithm is local in time but not local in space.

In this context. "local in space" means that a unit's weight vector can be updated using only information stored in the connected units and the unit itself, such that the update complexity of a single unit is linear in the dimensionality of the weight vector. "Local in time" means that the updates take place continually (online) and depend only on the most recent time step rather than on multiple time steps within a given time horizon as in BPTT.

While a conventional feed forward neural network passes data subsequently from one layer to another layer, in the case of an RNN, connections between the units form a directed cycle, which helps in exhibiting dynamic temporal behavior and is useful when the underlying data has sequence characteristics, as does text. In text or language applications, the appearance of a "next" word depends on the "previous" words mentioned in the conversation or written in the document.

EXAMPLES

Example 1

A system comprising:
a memory; and
a computer-readable medium having instructions stored thereon, which, when executed by a processor, cause the system to:
 obtain computerized textual input;
 tokenize the computerized textual input into a plurality of sentences;
 identify keywords in the plurality of sentences;
 generate a summary of the computerized textual input by automatically selecting a predetermined percentage of sentences from the plurality of sentences using the identified keywords;
 for each sentence in the summary:
  for each keyword in the sentence:
   replace the keyword with a gap;
   use a semantic-based approach to transform the gap-filled sentence into a question; and
   use a recurrent neural network approach to transform the gap-filled sentence into a question;

compute an intersection between questions generated using the semantic-based approach and questions generated using the recurrent neural network approach; and cause one or more of the questions in the intersection to be presented in a graphical user interface.

Example 2

The system of Example 1, wherein the generating the summary comprises:

generating a frequency map of words in the plurality of sentences;

filtering out words in the frequency map;

identifying a number of non-filtered-out words in the frequency map having a highest frequency as keywords;

ranking each of the plurality of sentences based on a number of keywords contained in each of the plurality of sentences; and generating the summary by selecting the predetermined percentage of sentences from the plurality of sentences having the highest rank.

Example 3

The system of Examples 1 or 2, wherein the instructions further cause the system to:

perform co-reference resolution on the plurality of sentences by, for each sentence of the plurality of sentences:

parsing the sentence using a natural language processing (NLP) parser to identify pronouns and noun phrases;

identifying attributes associated with each pronoun and noun phrase, the attributes including singularity, living/non-living status, and gender, with values assigned to each attribute for each pronoun or noun phrase being selected from a fixed value, a wild-card value, and a non-applicable value; and for each pronoun, mapping the pronoun to a referent noun phrase by identifying a closest noun phrase having matching attributes.

Example 4

The system of any of Examples 1-3, wherein the instructions further cause the system to identify a pronoun as expletive if it has no noun phrase having matching attributes within two sentences.

Example 5

The system of any of Examples 1-4, wherein a wild-card value for an attribute is considered a limited matching attribute for a particular noun phrase, and the mapping includes mapping the pronoun to the referent noun phrase by identifying a closest noun phrase having limited matching attributes if there are no noun phrases having matching attributes within two sentences.

Example 6

The system of any of Examples 1-5, wherein the graphical user interface is designed to present one or more questions in the intersection to a user and solicit answers, wherein incorrect answers by users identified as high confidence are passed to a recurrent neural network used in the recurrent neural network approach to retrain the recurrent neural network.

Example 7

The system of any of Examples 1-6, wherein the using the semantic-based approach includes:

performing semantic role labeling on the sentence to identify potential answer phrases;

for each potential answer phrase, identifying a corresponding verb complex;

applying one or more transformations to the sentence based on a predicate and target identified by the semantic role labeling; and applying one or more syntactic transformation rules to the verb complex of the sentence to transform the sentence into a question.

Example 8

A method comprising:

obtaining computerized textual input;

tokenizing the computerized textual input into a plurality of sentences;

identifying keywords in the plurality of sentences;

generating a summary of the computerized textual input by automatically selecting a predetermined percentage of sentences from the plurality of sentences using the identified keywords;

for each sentence in the summary:

for each keyword in the sentence:

replacing the keyword with a gap;

using a semantic-based approach to transform the gap-filled sentence into a question; and using a recurrent neural network approach to transform the gap-filled sentence into a question;

computing an intersection between questions generated using the semantic-based approach and questions generated using the recurrent neural network approach; and causing one or more of the questions in the intersection to be presented in a graphical user interface.

Example 9

The method of Example 8, wherein the generating the summary comprises:

generating a frequency map of words in the plurality of sentences;

filtering out words in the frequency map;

identifying a number of non-filtered-out words in the frequency map having a highest frequency as keywords;

ranking each of the plurality of sentences based on a number of keywords contained in each of the plurality of sentences; and generating the summary by selecting the predetermined percentage of sentences from the plurality of sentences having the highest rank.

Example 10

The method of Example 8 or 9, further comprising:

performing co-reference resolution on the plurality of sentences by, for each sentence of the plurality of sentences:

parsing the sentence using a natural language processing (NLP) parser to identify pronouns and noun phrases;

identifying attributes associated with each pronoun and noun phrase, the attributes including singularity, living/non-living status, and gender, with values assigned to each attribute for each pronoun or noun phrase being selected from a fixed value, a wild-card value, and a non-applicable value; and for each pronoun, mapping the pronoun to a referent noun phrase by identifying a closest noun phrase having matching attributes.

Example 11

The method of any of Examples 8-10, further comprising identifying a pronoun as expletive if it has no noun phrase having matching attributes within two sentences.

Example 12

The method of any of Examples 8-11, wherein a wild-card value for an attribute is considered a limited matching attribute for a particular noun phrase, and the mapping includes mapping the pronoun to the referent noun phrase by identifying a closest noun phrase having limited matching attributes if there are no noun phrases having matching attributes within two sentences.

Example 13

The method of any of claims 8-12, wherein the graphical user interface is designed to present one or more questions in the intersection to a user and solicit answers, wherein incorrect answers by users identified as high confidence are passed to a recurrent neural network used in the recurrent neural network approach to retrain the recurrent neural network.

Example 14

The method of any of claims 8-13, wherein the using the semantic-based approach includes:

performing semantic role labeling on the sentence to identify potential answer phrases;

for each potential answer phrase, identifying a corresponding verb complex;

applying one or more transformations to the sentence based on a predicate and target identified by the semantic role labeling; and applying one or more syntactic transformation rules to the verb complex of the sentence to transform the sentence into a question.

Example 15

A non-transitory machine-readable storage medium comprising instructions which, when implemented by one or more machines, cause the one or more machines to perform operations comprising:

obtaining computerized textual input;

tokenizing the computerized textual input into a plurality of sentences;

identifying keywords in the plurality of sentences;

generating a summary of the computerized textual input by automatically selecting a predetermined percentage of sentences from the plurality of sentences using the identified keywords;

for each sentence in the summary:
for each keyword in the sentence:
replacing the keyword with a gap;
using a semantic-based approach to transform the gap-filled sentence into a question; and using a recurrent neural network approach to transform the gap-filled sentence into a question;

computing an intersection between questions generated using the semantic-based approach and questions generated using the recurrent neural network approach; and causing one or more of the questions in the intersection to be presented in a graphical user interface.

Example 16

The non-transitory machine-readable storage medium of Example 15, wherein the generating the summary comprises:

generating a frequency map of words in the plurality of sentences;

filtering out words in the frequency map;

identifying a number of non-filtered-out words in the frequency map having a highest frequency as keywords;

ranking each of the plurality of sentences based on a number of keywords contained in each of the plurality of sentences; and generating the summary by selecting the predetermined percentage of sentences from the plurality of sentences having the highest rank.

Example 17

The non-transitory machine-readable storage medium of any of Examples 15-16, wherein the operations further comprise:

performing co-reference resolution on the plurality of sentences by, for each sentence of the plurality of sentences:

parsing the sentence using a natural language processing (NLP) parser to identify pronouns and noun phrases;

identifying attributes associated with each pronoun and noun phrase, the attributes including singularity, living/non-living status, and gender, with values assigned to each attribute for each pronoun or noun phrase being selected from a fixed value, a wild-card value, and a non-applicable value; and for each pronoun, mapping the pronoun to a referent noun phrase by identifying a closest noun phrase having matching attributes.

Example 18

The non-transitory machine-readable storage medium of any of Examples 15-17, wherein the operations further comprise identifying a pronoun as expletive if it has no noun phrase having matching attributes within two sentences.

Example 19

The non-transitory machine-readable storage medium of any of Examples 15-18, wherein a wild-card value for an attribute is considered a limited matching attribute for a particular noun phrase, and the mapping includes mapping the pronoun to the referent noun phrase by identifying a closest noun phrase having limited matching attributes if there are no noun phrases having matching attributes within two sentences.

Example 20

The non-transitory machine-readable storage medium of any of claims 15-19, wherein the graphical user interface is designed to present one or more questions in the intersection to a user and solicit answers, wherein incorrect answers by users identified as high confidence are passed to a recurrent neural network used in the recurrent neural network approach to retrain the recurrent neural network.

Figure 5:
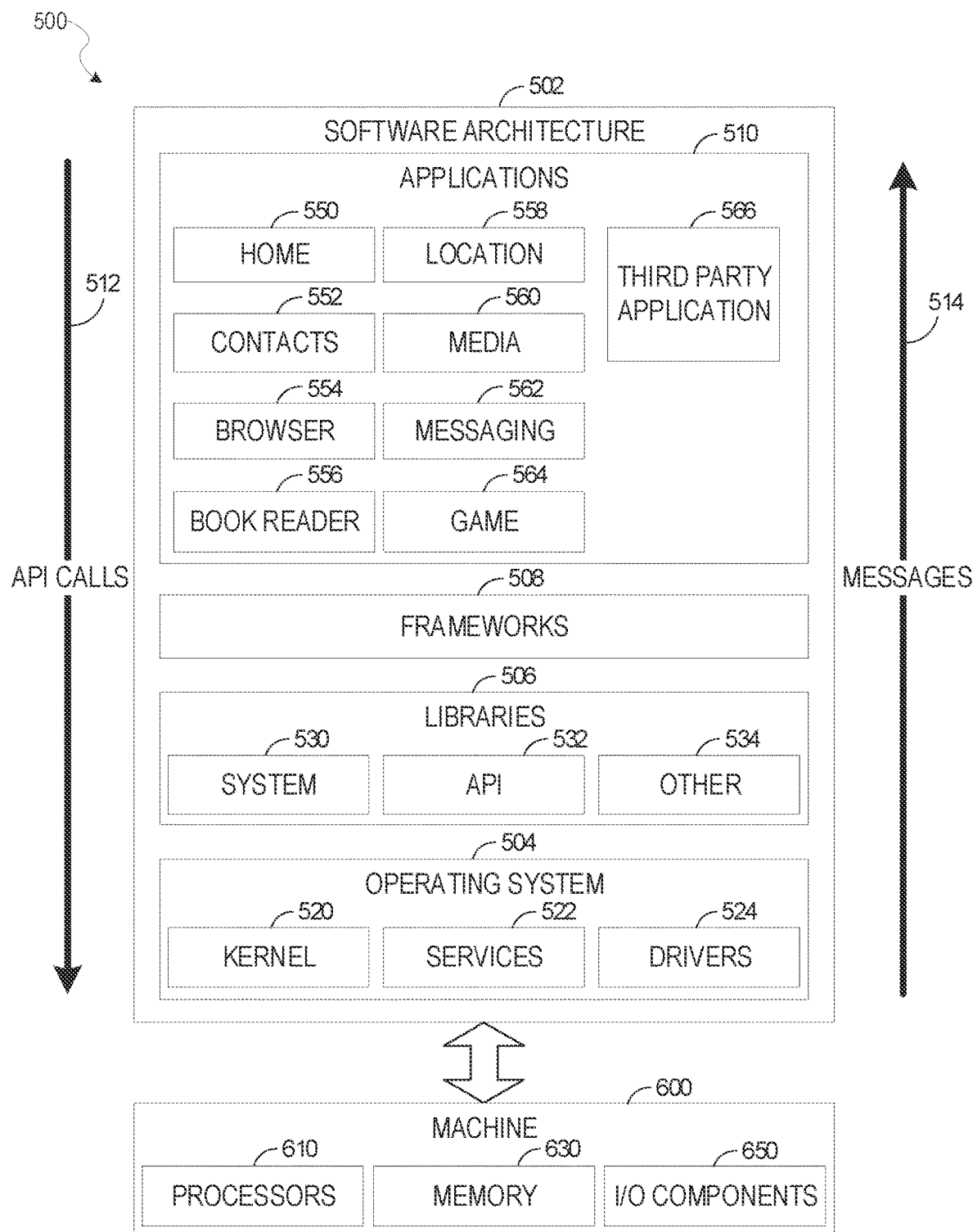
FIG. 5 is a block diagram illustrating an architecture of software, which can be installed on any one or more of the devices described above.

FIG. 5 is a block diagram 500 illustrating an architecture of software 502, which can be installed on any one or more of the devices described above. FIG. 5 is merely a non-limiting example of a software architecture, and it will be appreciated that many other architectures can be implemented to facilitate the functionality described herein. In various embodiments, the software 502 is implemented by hardware such as a machine 600 of FIG. 6 that includes processors 610, memory 630, and input/output (I/O) components 650. In this example architecture, the software 502 can be conceptualized as a stack of layers where each layer may provide a particular functionality. For example, the software 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC). Adaptive Multi-Rate (AMR) audio codec. Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system or platform.

In an example embodiment, the applications 510 include a home application 550, a contacts application 552, a browser application 554, a book reader application 556, a location application 558, a media application 560, a messaging application 562, a game application 564, and a broad assortment of other applications such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C. Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
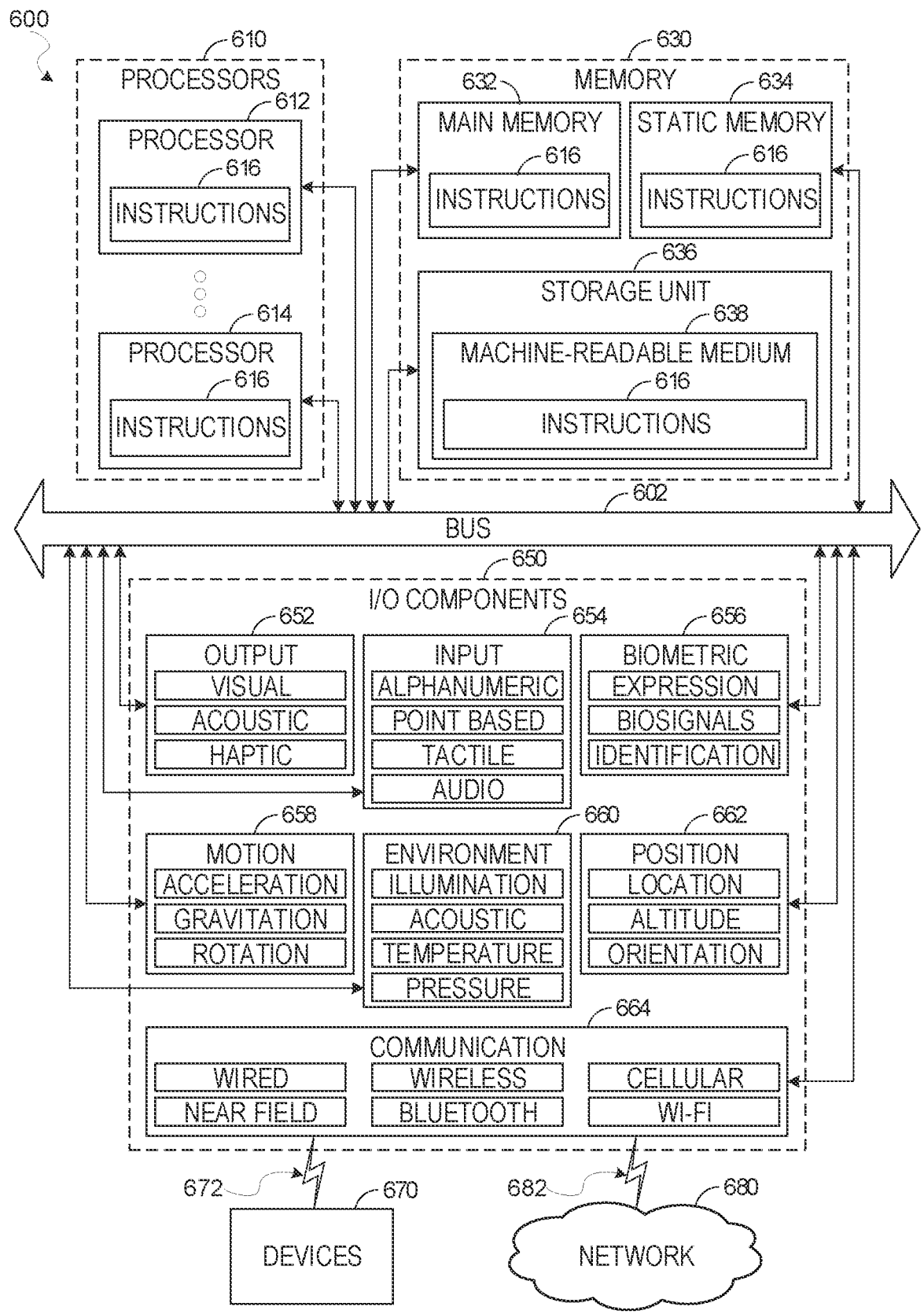
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 300 of FIG. 3 or the method 400 of FIG. 4. Additionally, or alternatively, the instructions 616 may implement FIGS. 1-4, and so forth. The instructions 616 may also be stored in machine-readable medium 638 and transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix. Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine-Storage Medium

The various memories (i.e., 630, 632, 634, and/or memory of the processor(s) 610) and/or the storage unit 636 may store one or more sets of instructions and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium." "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media." "computer-storage media," and "device-storage media" specifically exclude carrier waves, modulated data signals, and other such media, at least some of which are covered under the term "transmission medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium." and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a memory; and
   a computer-readable medium having instructions stored thereon, which, when executed by a processor, cause the system to perform operations comprising:
   obtain computerized textual input;
   tokenize the computerized textual input into a plurality of sentences;
   identify keywords in the plurality of sentences;
   generate a summary of the computerized textual input by automatically selecting a predetermined percentage of sentences from the plurality of sentences using the identified keywords;
   for each sentence in the summary:
   for each keyword in the sentence:
   replace the keyword with a gap;
   use a semantic-based approach to transform the gap-filled sentence into a question; and
   use a recurrent neural network approach to transform the gap-filled sentence into a question;
   compute an intersection between questions generated using the semantic-based approach and questions generated using the recurrent neural network approach; and
   cause one or more of the questions in the intersection to be presented in a graphical user interface.

2. The system of claim 1, wherein the generating the summary comprises:
   generating a frequency map of words in the plurality of sentences;
   filtering out words in the frequency map;
   identifying a number of non-filtered-out words in the frequency map having a highest frequency as keywords;
   ranking each of the plurality of sentences based on a number of keywords contained in each of the plurality of sentences; and
   generating the summary by selecting the predetermined percentage of sentences from the plurality of sentences having the highest rank.

3. The system of claim 1, wherein the instructions further cause the system to:

perform co-reference resolution on the plurality of sentences by, for each sentence of the plurality of sentences:

parsing the sentence using a natural language processing (NLP) parser to identify pronouns and noun phrases;

identifying attributes associated with each pronoun and noun phrase, the attributes including singularity, living/non-living status, and gender, with values assigned to each attribute for each pronoun or noun phrase being selected from a fixed value, a wild-card value, and a non-applicable value; and for each pronoun, mapping the pronoun to a referent noun phrase by identifying a closest noun phrase having matching attributes.

4. The system of claim 1, wherein the instructions further cause the system to identify a pronoun as expletive if it has no noun phrase having matching attributes within two sentences.

5. The system of claim 1, wherein a wild-card value for an attribute is considered a limited matching attribute for a particular noun phrase, and the mapping includes mapping the pronoun to the referent noun phrase by identifying a closest noun phrase having limited matching attributes if there are no noun phrases having matching attributes within two sentences.

6. The system of claim 1, wherein the graphical user interface is designed to present one or more questions in the intersection to a user and solicit answers, wherein incorrect answers by users identified as high confidence are passed to a recurrent neural network used in the recurrent neural network approach to retrain the recurrent neural network.

7. The system of claim 1, wherein the using the semantic-based approach includes:

performing semantic role labeling on the sentence to identify potential answer phrases;

for each potential answer phrase, identifying a corresponding verb complex;

applying one or more transformations to the sentence based on a predicate and target identified by the semantic role labeling; and applying one or more syntactic transformation rules to the verb complex of the sentence to transform the sentence into a question.

8. A method comprising:

obtaining computerized textual input;

tokenizing the computerized textual input into a plurality of sentences;

identifying keywords in the plurality of sentences;

generating a summary of the computerized textual input by automatically selecting a predetermined percentage of sentences from the plurality of sentences using the identified keywords;

for each sentence in the summary:

for each keyword in the sentence:

replacing the keyword with a gap;

using a semantic-based approach to transform the gap-filled sentence into a question; and using a recurrent neural network approach to transform the gap-filled sentence into a question;

computing an intersection between questions generated using the semantic-based approach and questions generated using the recurrent neural network approach; and causing one or more of the questions in the intersection to be presented in a graphical user interface.

9. The method of claim 8, wherein the generating the summary comprises:

generating a frequency map of words in the plurality of sentences;

filtering out words in the frequency map;

identifying a number of non-filtered-out words in the frequency map having a highest frequency as keywords;

ranking each of the plurality of sentences based on a number of keywords contained in each of the plurality of sentences; and generating the summary by selecting the predetermined percentage of sentences from the plurality of sentences having the highest rank.

10. The method of claim 8, further comprising:

performing co-reference resolution on the plurality of sentences by, for each sentence of the plurality of sentences:

parsing the sentence using a natural language processing (NLP) parser to identify pronouns and noun phrases;

identifying attributes associated with each pronoun and noun phrase, the attributes including singularity, living/non-living status, and gender, with values assigned to each attribute for each pronoun or noun phrase being selected from a fixed value, a wild-card value, and a non-applicable value; and for each pronoun, mapping the pronoun to a referent noun phrase by identifying a closest noun phrase having matching attributes.

11. The method of claim 8, further comprising identifying a pronoun as expletive if it has no noun phrase having matching attributes within two sentences.

12. The method of claim 8, wherein a wild-card value for an attribute is considered a limited matching attribute for a particular noun phrase, and the mapping includes mapping the pronoun to the referent noun phrase by identifying a closest noun phrase having limited matching attributes if there are no noun phrases having matching attributes within two sentences.

13. The method of claim 8, wherein the graphical user interface is designed to present one or more questions in the intersection to a user and solicit answers, wherein incorrect answers by users identified as high confidence are passed to a recurrent neural network used in the recurrent neural network approach to retrain the recurrent neural network.

14. The method of claim 8, wherein the using the semantic-based approach includes:

performing semantic role labeling on the sentence to identify potential answer phrases;

for each potential answer phrase, identifying a corresponding verb complex;

applying one or more transformations to the sentence based on a predicate and target identified by the semantic role labeling; and applying one or more syntactic transformation rules to the verb complex of the sentence to transform the sentence into a question.

15. A non-transitory machine-readable storage medium comprising instructions which, when implemented by one or more machines, cause the one or more machines to perform operations comprising:
- obtaining computerized textual input;
- tokenizing the computerized textual input into a plurality of sentences;
- identifying keywords in the plurality of sentences;
- generating a summary of the computerized textual input by automatically selecting a predetermined percentage of sentences from the plurality of sentences using the identified keywords;
- for each sentence in the summary:
  - for each keyword in the sentence:
    - replacing the keyword with a gap;
    - using a semantic-based approach to transform the gap-filled sentence into a question; and
    - using a recurrent neural network approach to transform the gap-filled sentence into a question;
- computing an intersection between questions generated using the semantic-based approach and questions generated using the recurrent neural network approach; and
- causing one or more of the questions in the intersection to be presented in a graphical user interface.

16. The non-transitory machine-readable storage medium of claim 15, wherein the generating the summary comprises:
- generating a frequency map of words in the plurality of sentences;
- filtering out words in the frequency map;
- identifying a number of non-filtered-out words in the frequency map having a highest frequency as keywords;
- ranking each of the plurality of sentences based on a number of keywords contained in each of the plurality of sentences; and
- generating the summary by selecting the predetermined percentage of sentences from the plurality of sentences having the highest rank.

17. The non-transitory machine-readable storage medium of claim 15, wherein the operations further comprise:
- performing co-reference resolution on the plurality of sentences by, for each sentence of the plurality of sentences:
  - parsing the sentence using a natural language processing (NLP) parser to identify pronouns and noun phrases;
  - identifying attributes associated with each pronoun and noun phrase, the attributes including singularity, living/non-living status, and gender, with values assigned to each attribute for each pronoun or noun phrase being selected from a fixed value, a wild-card value, and a non-applicable value; and
  - for each pronoun, mapping the pronoun to a referent noun phrase by identifying a closest noun phrase having matching attributes.

18. The non-transitory machine-readable storage medium of claim 15, wherein the operations further comprise identifying a pronoun as expletive if it has no noun phrase having matching attributes within two sentences.

19. The non-transitory machine-readable storage medium of claim 15, wherein a wild-card value for an attribute is considered a limited matching attribute for a particular noun phrase, and the mapping includes mapping the pronoun to the referent noun phrase by identifying a closest noun phrase having limited matching attributes if there are no noun phrases having matching attributes within two sentences.

20. The non-transitory machine-readable storage medium of claim 15, wherein the graphical user interface is designed to present one or more questions in the intersection to a user and solicit answers, wherein incorrect answers by users identified as high confidence are passed to a recurrent neural network used in the recurrent neural network approach to retrain the recurrent neural network.

\* \* \* \* \*